(12) United States Patent
Hansen et al.

(10) Patent No.: US 9,344,535 B2
(45) Date of Patent: May 17, 2016

(54) MULTIPLE PROTOCOL WIRELESS COMMUNICATIONS IN A WLAN

(75) Inventors: Christopher J. Hansen, Sunnyvale, CA (US); Jason A. Trachewsky, Menlo Park, CA (US); Rajendra Tushar Moorti, Mountain View, CA (US); Matthew James Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 473 days.

(21) Appl. No.: 12/711,225

(22) Filed: Feb. 23, 2010

(65) Prior Publication Data

US 2010/0142505 A1 Jun. 10, 2010

Related U.S. Application Data

(63) Continuation of application No. 10/857,544, filed on May 28, 2004, now Pat. No. 7,680,059.

(60) Provisional application No. 60/544,605, filed on Feb. 13, 2004.

(51) Int. Cl.
*H04L 29/06* (2006.01)
*H04W 80/00* (2009.01)
*H04W 84/12* (2009.01)

(52) U.S. Cl.
CPC ............. *H04L 69/18* (2013.01); *H04L 69/24* (2013.01); *H04W 80/00* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 6,418,494 B1* | 7/2002 | Shatas et al. | ................... | 710/305 |
| 6,553,032 B1* | 4/2003 | Farley | ................... | H04L 1/1635 |
| | | | | 370/229 |
| 6,807,639 B2* | 10/2004 | Shatas et al. | ................... | 713/400 |
| 6,845,084 B2* | 1/2005 | Rangnekar et al. | ............ | 370/254 |
| 6,957,086 B2* | 10/2005 | Bahl et al. | ...................... | 455/557 |
| 6,999,432 B2* | 2/2006 | Zhang et al. | ................... | 370/328 |
| 7,027,418 B2* | 4/2006 | Gan et al. | ....................... | 370/329 |
| 7,073,018 B1* | 7/2006 | James et al. | ................... | 711/108 |
| 7,251,685 B1* | 7/2007 | Yildiz | ........................... | 709/221 |
| 7,277,404 B2* | 10/2007 | Tanzella et al. | ................ | 370/310 |
| 7,280,495 B1* | 10/2007 | Zweig et al. | ................... | 370/312 |
| 7,304,973 B2* | 12/2007 | Kandala | ........................ | 370/338 |
| 7,340,015 B1* | 3/2008 | Jones et al. | .................... | 375/347 |
| 7,363,572 B2* | 4/2008 | Sidenblad et al. | ............. | 714/758 |
| 7,420,936 B2* | 9/2008 | Nevo et al. | ..................... | 370/278 |
| 7,477,624 B2* | 1/2009 | Gan et al. | ....................... | 370/329 |
| 7,545,867 B1* | 6/2009 | Lou et al. | ....................... | 375/259 |
| 7,546,385 B1* | 6/2009 | Henry et al. | .................... | 709/250 |

(Continued)

*Primary Examiner* — Gregory Sefcheck
(74) *Attorney, Agent, or Firm* — Garlick & Markison; Bruce E. Garlick

(57) ABSTRACT

A method for multiple protocol wireless communications begins by determining protocols of wireless communication devices within a proximal region. The method then continues by determining whether the protocols of the wireless communication devices within the proximal region are of a like protocol. The method continues by, when the protocols of the wireless communication devices within the proximal region are not of a like protocol, selecting a protocol of the protocols of the wireless communication devices within the proximal region based on a protocol ordering to produce a selected protocol. The method continues by utilizing the selected protocol by the wireless communication devices within the proximal region to set up a wireless communication within the proximal region.

20 Claims, 11 Drawing Sheets

(56) References Cited

U.S. PATENT DOCUMENTS

| | | | |
|---|---|---|---|
| 7,558,852 B2* | 7/2009 | Douglas et al. | 709/224 |
| 7,606,575 B2* | 10/2009 | Mahany et al. | 455/452.2 |
| 7,688,898 B1* | 3/2010 | Lou et al. | 375/259 |
| 7,706,322 B2* | 4/2010 | Hautamaki et al. | 370/328 |
| 7,715,350 B2* | 5/2010 | Bagchi et al. | 370/338 |
| 7,773,708 B2* | 8/2010 | Parantainen | 375/354 |
| 7,876,770 B1* | 1/2011 | Tang et al. | 370/445 |
| 7,916,746 B2* | 3/2011 | Yonge et al. | 370/445 |
| 7,991,430 B2* | 8/2011 | Bagchi et al. | 455/552.1 |
| 8,238,453 B1* | 8/2012 | Lou et al. | 375/259 |
| 8,321,542 B1* | 11/2012 | Farley | H04W 28/0247 370/229 |
| 8,634,483 B1* | 1/2014 | Lou et al. | 375/259 |
| 2002/0089994 A1* | 7/2002 | Leach et al. | 370/412 |
| 2003/0108062 A1* | 6/2003 | Agrawal et al. | 370/463 |
| 2004/0017794 A1* | 1/2004 | Trachewsky | 370/338 |
| 2006/0116148 A1* | 6/2006 | Bahl et al. | 455/517 |
| 2008/0031179 A1* | 2/2008 | Gao et al. | 370/312 |

* cited by examiner proximal area includes only 802.11n devices proximal area w/802.11n & 802.11a &/or 802.11g devices proximal area includes 802.11n & 802.11a, .11b &/or .11g devices

MULTIPLE PROTOCOL WIRELESS COMMUNICATIONS IN A WLAN

CROSS REFERENCE TO RELATED APPLICATION

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility application Ser. No. 10/857,544, entitled "MULTIPLE PROTOCOL WIRELESS COMMUNICATIONS IN A WLAN," filed May 28, 2004, pending, which claims priority pursuant to 35 U.S.C. §119(e) to the following U.S. Provisional Patent Application which is hereby incorporated herein by reference in its entirety and made part of the present U.S. Utility patent application for all purposes:

a. U.S. Provisional Application Ser. No. 60/544,605, entitled "MULTIPLE PROTOCOL WIRELESS COMMUNICATIONS IN A WLAN," filed Feb. 13, 2004.

BACKGROUND

1. Technical Field

This invention relates generally to wireless communication systems and more particularly to supporting multiple wireless communication protocols within a wireless local area network.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is further known, the standard to which a wireless communication device is compliant within a wireless communication system may vary. For instance, as the IEEE 802.11 specification has evolved from IEEE 802.11 to IEEE 802.11b to IEEE 802.11a and to IEEE 802.11g, wireless communication devices that are compliant with IEEE 802.11b may exist in the same wireless local area network (WLAN) as IEEE 802.11g compliant wireless communication devices. As another example, IEEE 802.11a compliant wireless communication devices may reside in the same WLAN as IEEE 802.11g compliant wireless communication devices. When legacy devices (i.e., those compliant with an earlier version of a standard) reside in the same WLAN as devices compliant with later versions of the standard, a mechanism is employed to insure that legacy devices know when the newer version devices are utilizing the wireless channel as to avoid a collision.

For instance, backward compatibility with legacy devices has been enabled exclusively at either the physical (PHY) layer (in the case of IEEE 802.11b) or the Media-Specific Access Control (MAC) layer (in the case of 802.11g). At the PHY layer, backward compatibility is achieved by re-using the PHY preamble from a previous standard. In this instance, legacy devices will decode the preamble portion of all signals, which provides sufficient information for determining that the wireless channel is in use for a specific period of time, thereby avoid collisions even though the legacy devices cannot fully demodulate and/or decode the transmitted frame(s).

At the MAC layer, backward compatibility with legacy devices is enabled by forcing devices that are compliant with a newer version of the standard to transmit special frames using modes or data rates that are employed by legacy devices. For example, the newer devices may transmit Clear to Send/Ready to Send (CTS/RTS) exchange frames and/or CTS to self frames as are employed in IEEE 802.11g. These special frames contain information that sets the NAV (network allocation vector) of legacy devices such that these devices know when the wireless channel is in use by newer stations.

Both of the existing mechanisms for backward compatibility suffer from a performance loss relative to that which can be achieved without backward compatibility and are used independently of each other.

Therefore, a need exists for a method and apparatus that enables multiple protocols to be supported within a wireless communication system, including wireless local area networks.

SUMMARY

The present invention is directed to apparatus and methods of operation that are further described in the following Brief Description of the Drawings, the Detailed Description of the Drawings, and the Claims. Other features and advantages of the present invention will become apparent from the following Detailed Description of the Drawings.

DETAILED DESCRIPTION OF THE DRAWINGS

Figure 1:
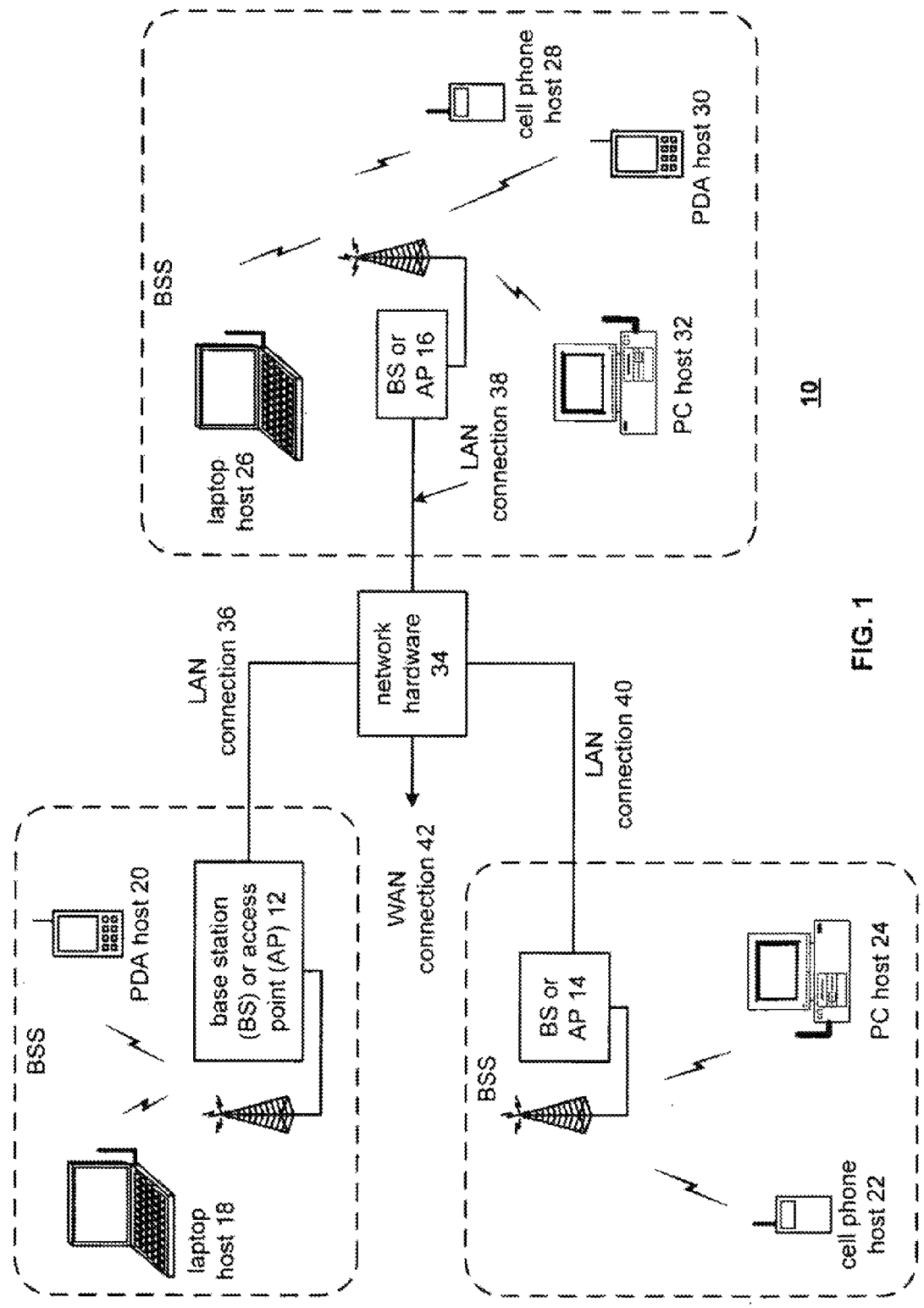
FIG. 1 is a schematic block diagram of a wireless communication system in accordance with the present invention.

Provided is a method for multiple protocol wireless communications in a wireless local area network that begins by determining protocols of wireless communication devices within a proximal region. The method then continues by determining whether the protocols of the wireless communication devices within the proximal region are of a like protocol. The method continues by, when the protocols of the wireless communication devices within the proximal region are not of a like protocol, selecting a protocol of the protocols of the wireless communication devices within the proximal region based on a protocol ordering to produce a selected protocol. The method continues by utilizing the selected protocol by the wireless communication devices within the proximal region to set up a wireless communication within the proximal region.

In another embodiment, a method for a wireless communication device to participate in multiple protocol wireless communications begins by affiliating with an access point utilizing a protocol of the wireless communication device. The method continues by receiving a selected protocol from the access point. The method continues by determining whether the selected protocol and the protocol of the wireless communication device are of a like protocol. The method continues by, when the selected protocol and the protocol of the wireless communication device are not of the like protocol, utilizing the selected protocol to set up a wireless communication and utilizing the protocol of the wireless communication device for the wireless communication.

In a further embodiment, a method for a wireless communication device to participate in multiple protocol wireless communications begins by receiving a frame via a wireless channel. The method continues by, when a selected protocol is not of a like protocol of the wireless communication device, utilizing the selected protocol to interpret at least a portion of wireless communication set up information of the frame. The method continues by, based on the interpreting of the at least a portion of the wireless communication set up information, determining whether a remainder of the frame is formatted in accordance with the protocol of the wireless communication device. The method continues by, when the remainder of the frame is formatted in accordance with the protocol of the wireless communication device, processing the remainder of the frame based in accordance with the protocol of the wireless communication device.

In yet another embodiment, a method for a wireless communication device to participate in multiple protocol wireless communications begins by determining whether a selected protocol is of a like protocol of the wireless communication device. The method continues by, when the selected protocol is not of the like protocol of the wireless communication device, formatting a portion of wireless communication set up information in accordance with the selected protocol to produce legacy formatted set up information. The method continues by formatting remainder of the wireless communication set up information in accordance with the protocol of the wireless communication device to produce current formatted set up information. The method continues by formatting data in accordance with the protocol of the wireless communication device to produce current formatted data. The method continues by transmitting a frame containing the legacy formatted set up information, the current formatted set up information, and the current formatted data.

Referring to the figures, FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its regional area, which is generally referred to as a basic service set (BSS). Typically, the wireless communication devices register with a particular base station or access point 12-14 to receive services from the communication system 10. For direct connections (i.e., point-to-point communications), wireless communication devices communicate directly via an allocated channel to produce an ad-hoc network.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
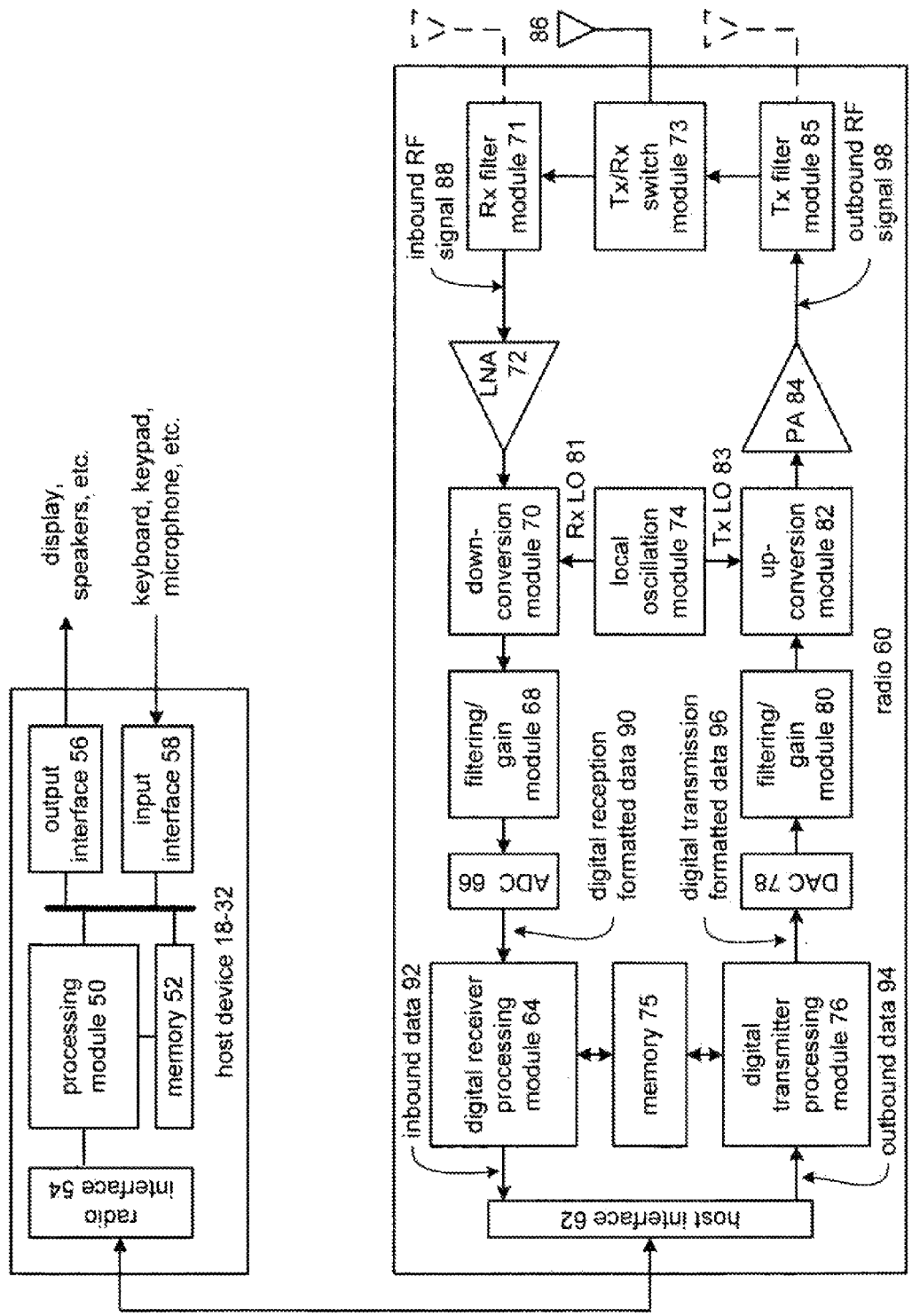
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, memory 75, a digital transmitter processing module 76, and a radio transceiver. The radio transceiver includes an analog-to-digital converter 66, a filtering/gain module 68, an IF mixing down conversion stage 70, a receiver filter 71, a low noise amplifier 72, a transmitter/receiver switch 73, a local oscillation module 74, a digital-to-analog converter 78, a filtering/gain module 80, an IF mixing up conversion stage 82, a power amplifier 84, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively, in accordance with one or more wireless communication standards and as further function to implement one or more aspects of the functionality described with reference to FIGS. 3-11. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11 and versions thereof, Bluetooth and versions thereof, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
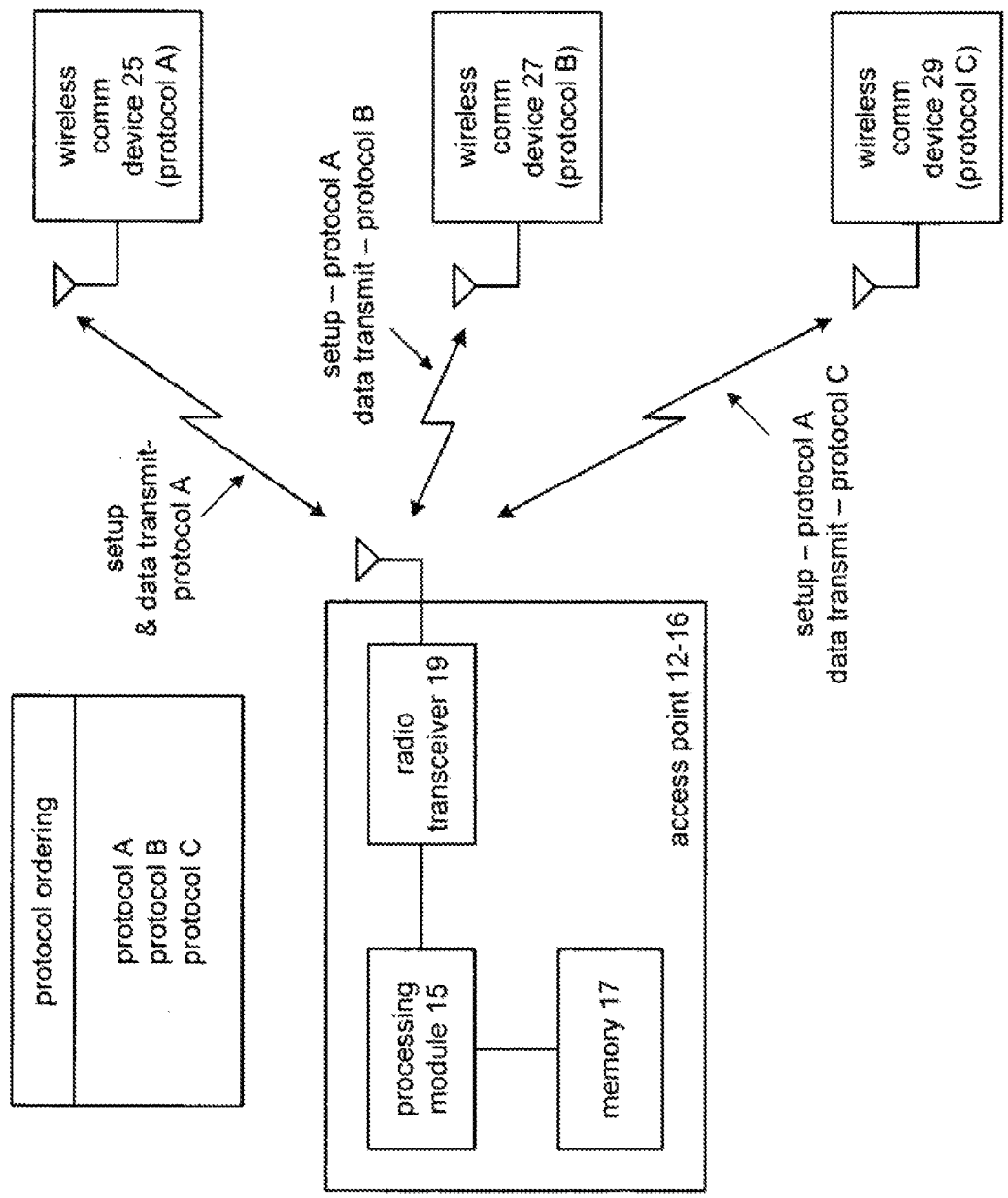
FIG. 3 is a schematic block diagram of an access point communicating with wireless communication devices in accordance with the present invention.

FIG. 3 is a schematic block diagram of an access point 12-16 communicating with wireless communication devices 25, 27 and/or 29. The wireless communication devices 25, 27 and/or 29 may be any one of the devices 18-32 illustrated in FIG. 1 and discussed in detail in FIG. 2. In this illustration, access point 12-16 includes a processing module 15, memory 17 and a radio transceiver 19. The radio transceiver 19 may be similar to the radio transceiver of each wireless communication device in architecture and may include a plurality of antennas, transmit paths and receive paths for multiple wireless communications within a proximal region or basic service set. The processing module 15 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 17 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 15 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory 17 stores, and the processing module 15 executes, operational instructions corresponding to at least some of the steps and/or functions illustrated in FIGS. 3-11.

In this illustration, each of the wireless communication devices 25, 27 and 29 utilize a different wireless communication protocol. As illustrated, wireless communication device 25 utilizes protocol A, wireless communication device 27 utilizes protocol B and wireless communication device 29 utilizes protocol C. For example, protocols A, B and C may correspond to different versions of the IEEE 802.11 standard. In particular, protocol A may correspond to IEEE 802.11b, protocol B may correspond to IEEE 802.11g and protocol C may correspond to IEEE 802.11n.

FIG. 3 further illustrates a protocol ordering table that has protocol A, protocol B and protocol C listed in order. The ordering may be based on the legacy of each of the corresponding protocols where the first protocol in the ordering is the oldest standard and the last entry in the protocol ordering is the most current standard. For example, in this present illustration protocol A may correspond to IEEE 802.11b, protocol B may correspond to IEEE 802.11g and protocol C may correspond to IEEE 802.11n. Alternatively, the protocol ordering may be based on a user defined and/or system administrator defined procedure. For instance, if an unacceptable number of transmission errors occur due to non-recognition of frames while utilizing protocol A to set-up wireless communications, the user may select the protocol B format for setting up a wireless communication. This concept will be described in greater detail with reference to the remaining figures.

In operation, the access point 12-16, and/or each of the wireless communication devices 25, 27 and 29, determine the protocol utilized by each of the wireless communication devices within the proximal region. Recall that the proximal region may include a basic service set and/or neighboring basic service sets and/or a direct, or ad-hoc network wherein the wireless communication devices communicate directly. Once the protocol of each of the wireless communication devices has been determined, the access point 12-16 and/or the wireless communication devices 25-29 determine, based on the protocol ordering, which protocol will be utilized to set-up a wireless communication. For instance, if protocol A corresponds to IEEE 802.11b, the communication devices will utilize a MAC level protection mechanism to set-up a wireless communication, as will be further described with reference to FIG. 6. As such, each of the wireless communication devices will utilize protocol A to set-up, or establish, a wireless communication such that the legacy devices recognize that a wireless communication is being set-up and also recognizes the duration of that wireless communication such that it will not transmit during that time, thus avoiding a collision.

Once the wireless communication is established, or set-up, utilizing a selected protocol (e.g., protocol A) from the protocol ordering, the communication device then utilizes its protocol to transmit the data for the remainder of the wireless communication. For example, wireless communication device 25 will utilize protocol A to establish and to transmit data for a wireless communication. Wireless communication device 27 will utilize protocol A to set-up a wireless communication and then use protocol B for the corresponding data transmission of the wireless communication. Similarly, wireless communication device 29 will utilize protocol A to establish, or set-up, the wireless communication and then use protocol C for the data transmission portion of the wireless communication.

As one of average skill in the art will appreciate, if the proximal region only includes wireless communication devices that utilize the same protocol, the set-up and data transmission is done using that protocol. As one of average skill in the art will further appreciate, if only two different protocols are present within the proximal region, the legacy protocol will be selected as the set-up protocol.

Figure 4:
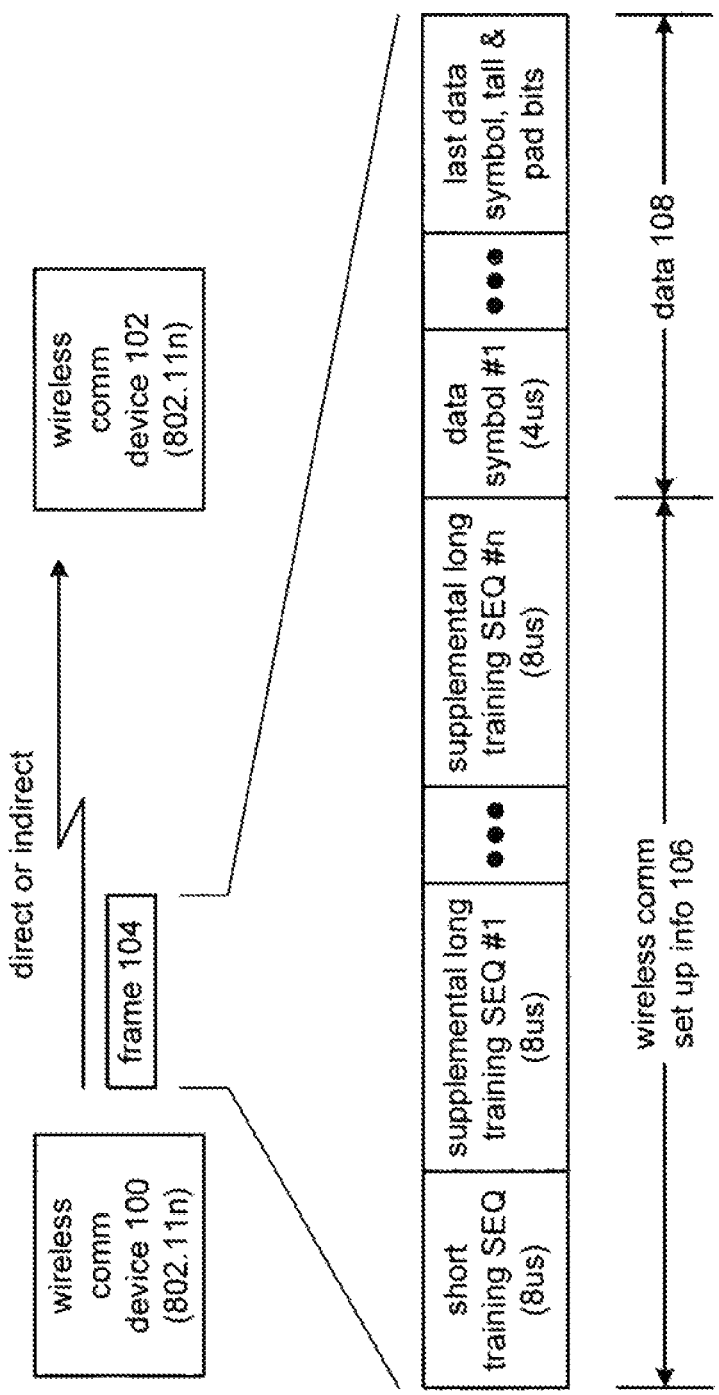
FIG. 4 is a diagram depicting one type of wireless communication in accordance with the present invention.

FIG. 4 is a diagram depicting a wireless communication between two wireless communication devices 100 and 102 that are in a proximal region where the only protocol that is used is IEEE 802.11n. The wireless communication may be direct (i.e., from wireless communication device to wireless communication device), or indirect (i.e., from a wireless communication device to an access point to a wireless communication device). In this example, wireless communication device 100 is providing frame 104 to wireless communication device 102. The frame 104 includes a wireless communication set-up information field 106 and a data portion 108. The wireless communication set-up information portion 106 includes a short training sequence that may be 8 microseconds long, a $1^{st}$ supplemental long training sequence that may be 8 microseconds long, which is one of a plurality of supplemental long training sequences. Note that the number of supplemental long training sequences will correspond to the number of transmit antennas being utilized for multiple input multiple output radio communications.

The data portion of the frame 104 includes a plurality of data symbols each being 4 microseconds in duration. The last data symbol also includes tail bits and padding bits as needed.

Figure 5:
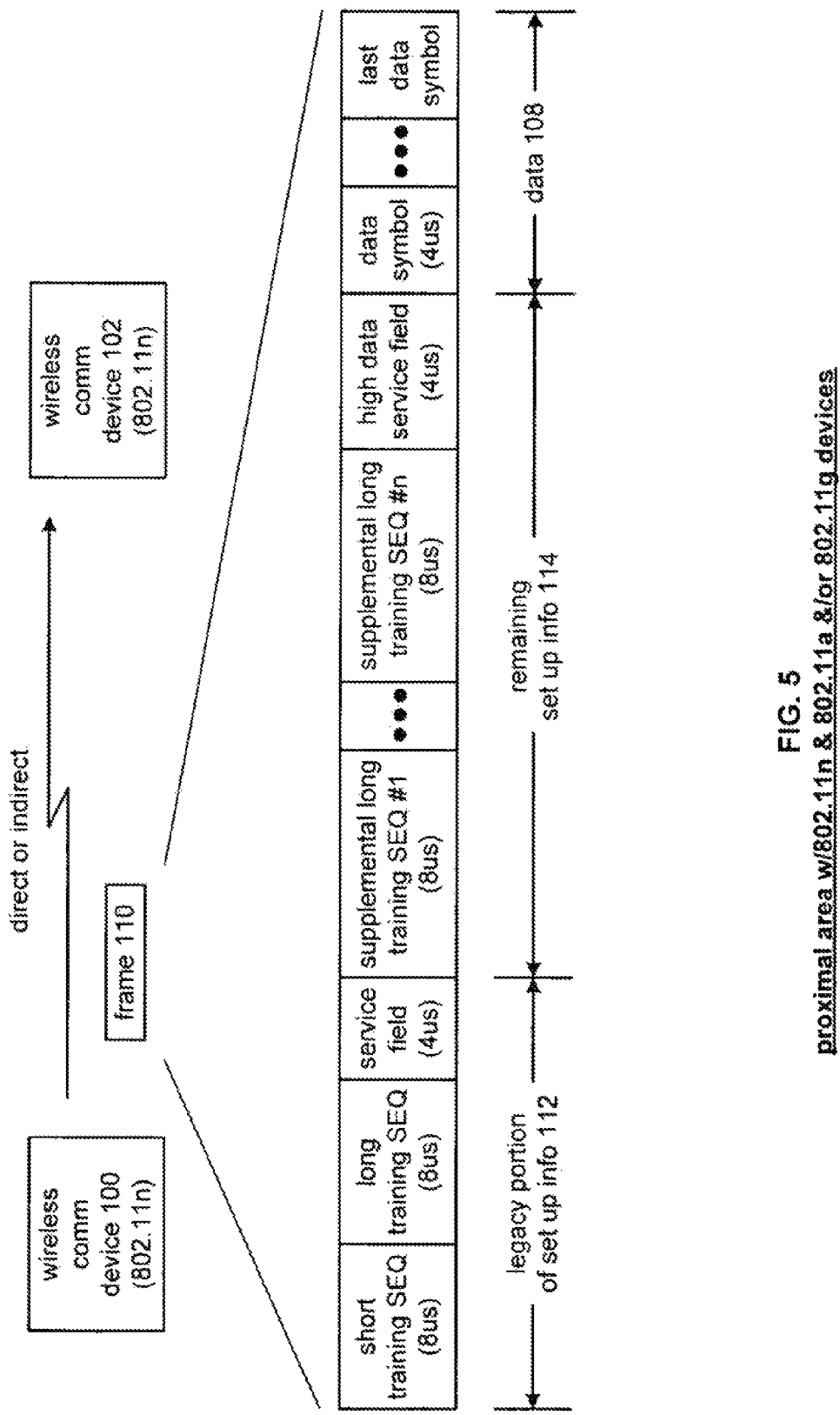
FIG. 5 is a diagram depicting another type of wireless communication in accordance with the present invention.

FIG. 5 is a diagram of a wireless communication between two wireless communication devices 100 and 102, each of which is compliant with IEEE 802.11n. Such a communication is taking place within a proximal area that includes 802.11n compliant devices, 802.11a compliant devices and/or 802.11g compliant devices. In this instance, the wireless communication may be direct or indirect where a frame 110 includes a legacy portion of the set-up information 112, remaining set-up information portion 114, and the data portion 108.

The legacy portion of the set-up information 112 includes a short training sequence, which is 8 microseconds in duration, a long training sequence, which is 8 microseconds in duration, and a service field, which is 4 microseconds in duration. The service field, as is known, includes several bits to indicate the duration of the frame 110. As such, the IEEE 802.11a compliant devices within the proximal area and the 802.11g compliant devices within the proximal area will recognize that a frame is being transmitted even though such devices will not be able to interpret the remaining portion of the frame. In this instance, the legacy devices (IEEE 802.11a and IEEE 802.11g) will avoid a collision with the IEEE 802.11n communication based on a proper interpretation of the legacy portion of the set-up information 112.

The remaining set-up information 114 includes additional supplemental long training sequences, which are each 8 microseconds in duration. The remaining set-up information further includes a high data service field, which is 4 microseconds in duration to provide additional information regarding the frame. The data portion 108 includes the data symbols, which are 4 microseconds in duration as previously described with reference to FIG. 3. In this instance, the legacy protection is provided at the physical layer.

Figure 6:
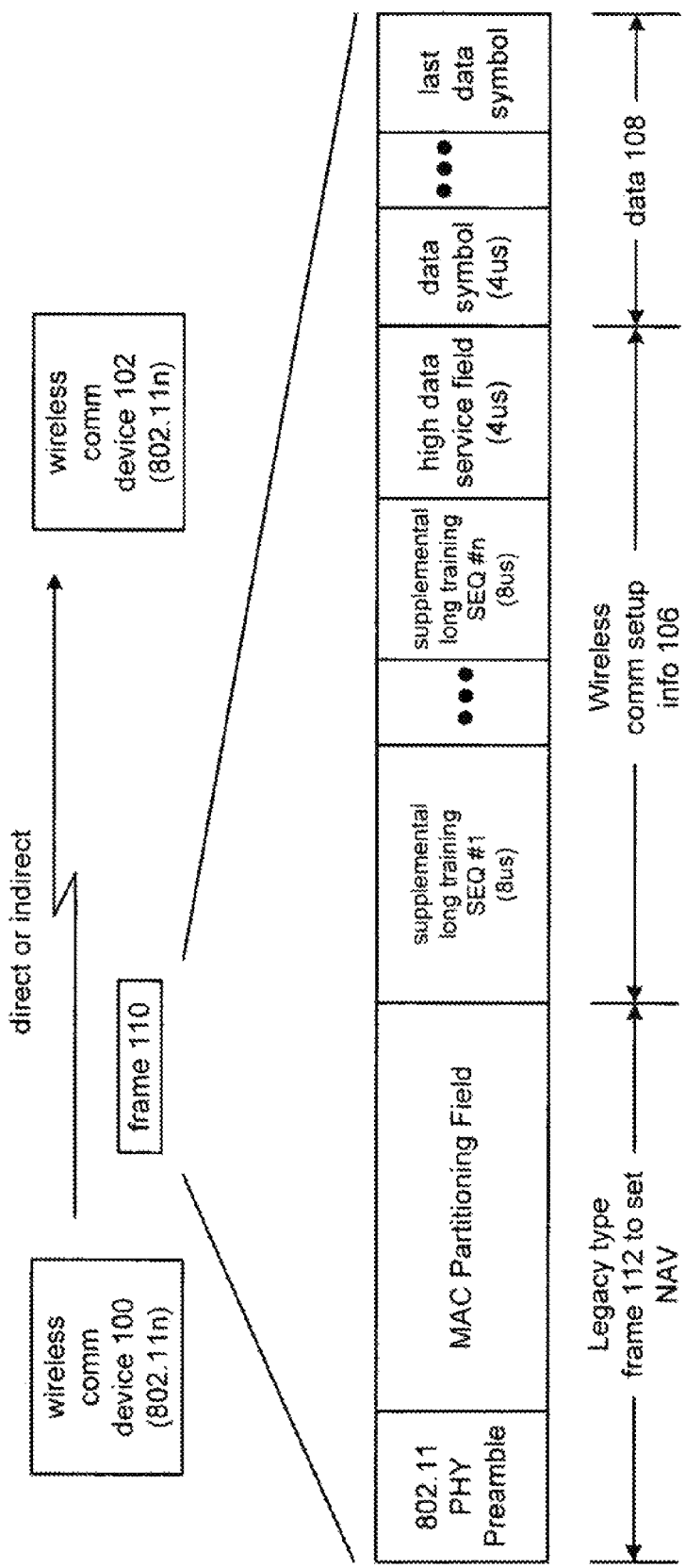
FIG. 6 is a diagram of yet another wireless communication in accordance with the present invention.

FIG. 6 is a diagram of a wireless communication between two wireless communication devices 100 and 102 that are both IEEE 802.11n compliant. The wireless communication may be direct or indirect within a proximal area that includes IEEE 802.11 compliant devices, IEEE 802.11a, 802.11b and/or 802.11g devices. In this instance, the frame includes a legacy portion of the set-up information 112, remaining set-up information 114 and the data portion 108. As shown, the legacy portion of the set-up information 112, or legacy frame, includes an IEEE 802.11 PHY preamble and a MAC partitioning frame portion, which indicates the particulars of this particular frame that may be interpreted by legacy devices. In this instance, the legacy protection is provided at the MAC layer.

The remaining set-up information 114 includes a plurality of supplemental long training sequences and the high data service field. The data portion 108 includes a plurality of data symbols as previously described.

Figure 7:
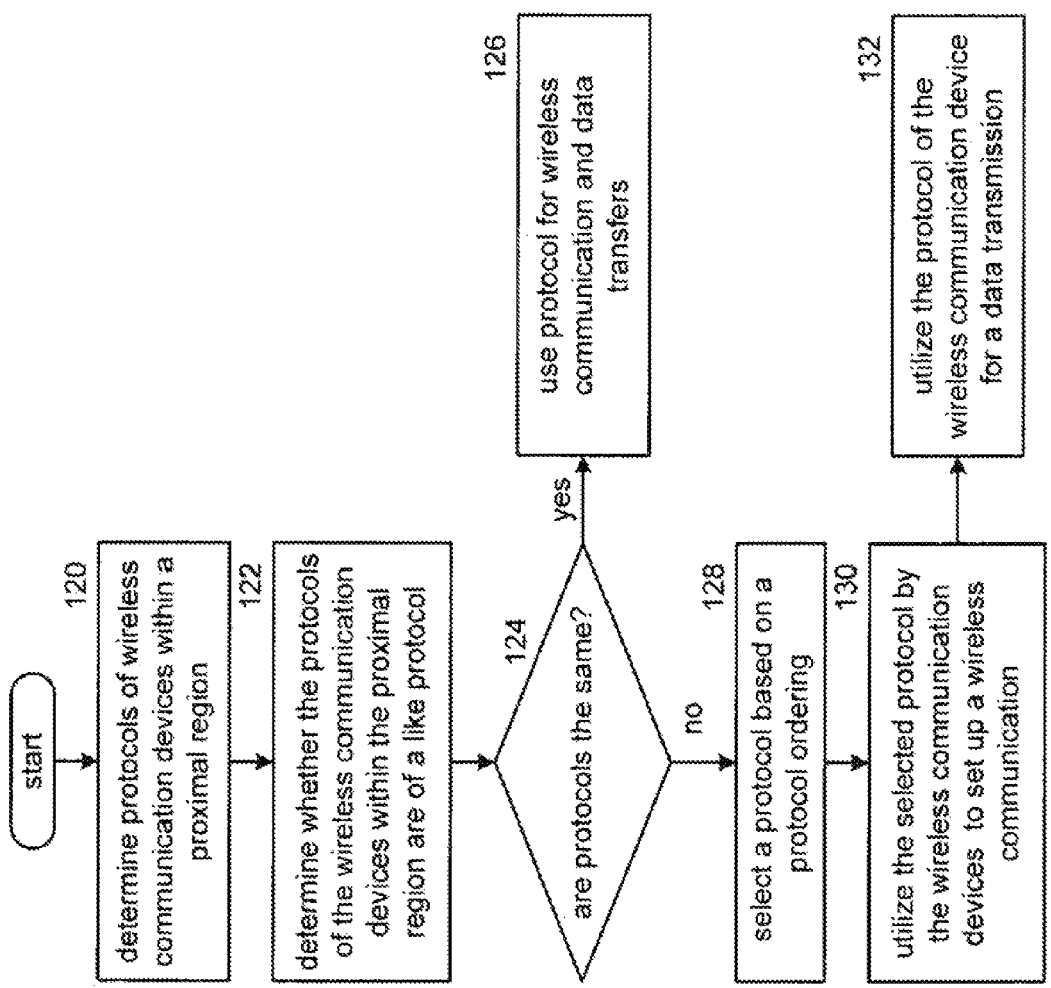
FIG. 7 is a logic diagram of a method for multiple protocol communications in accordance with the present invention.

FIG. 7 is a method for multiple protocol wireless communications in a WLAN. The method begins at step 120, where an access point (for indirect wireless communications) or a wireless communication device (for direct wireless communications), determines protocols of wireless communication devices within a proximal region. In an embodiment, the protocols may be determined based on frequency band of use and wireless local area network communication format of each of the wireless communication devices. For example, if the frequency band is 2.4 GHz, a device may have a WLAN communication format in accordance with IEEE 802.11b, IEEE 802.11g, and/or IEEE 802.11n. If the frequency band is 4.9-5.85 GHz, a device may have a WLAN communication format in accordance with IEEE 802.11a or IEEE 802.11n. Further, the proximal region includes coverage area of a basic service set, coverage area of an ad-hoc network, and/or coverage area of the basic service set and at least a portion of at least one neighboring basic service set. With reference to FIG. 1, neighboring BSS of access point 12 include the BSS of access point 14 and/or the BSS of access point 16.

Returning to the logic diagram of FIG. 7, the process continues at step 122 where the access point and/or the wireless communication device determines whether the protocols of the wireless communication devices within the proximal region are of a like protocol. The process then proceeds to step 124 where the process branches depending on whether the protocols of the wireless communication devices within the proximal region are of a like protocol. When the wireless communication devices within the proximal region all use the same protocol, the process proceeds to step 126 where the wireless communication devices use their protocol for setting up a wireless communication and for the wireless communication.

If, however, at least one wireless communication device has a different protocol, the process proceeds to step 128 where the access point or a wireless communication device selects a protocol of the protocols of the wireless communication devices within the proximal region based on a protocol ordering to produce a selected protocol. The protocol ordering may be an ordering of the protocols based on legacy ordering of wireless communication devices and/or an ordering of the protocols based on a transmission efficiency ordering of the protocols. For example, IEEE 802.11, IEEE 802.11b, IEEE 802.11g, and IEEE 802.11n compliant devices operate in the 2.4 GHz frequency band and IEEE 802.11a and IEEE 802.11n compliant devices operate in the 4.9-5.85 GHz frequency band. Thus, in the 2.4 GHz frequency band, if 802.11b stations are present with 802.11n device, MAC level protection mechanisms, such as those defined in 802.11g, and as shown in FIG. 6, may be used. However, if the only legacy 802.11g devices are present with 802.11n devices, then either MAC level (e.g., FIG. 6) or PHY level (e.g., FIG. 5) protection mechanisms may be used. In the 4.9-5.85 GHz frequency band, if 802.11a devices are present with 802.11n devices, the MAC level protection mechanism or the PHY level protection mechanism may be used.

As one of average skill in the art will appreciate, it may be more desirable to use a PHY level protection mechanism, than a MAC level protection mechanism because the throughput impact will be less since the additional frames of the MAC level protection are not needed. Thus, when possible, the PHY mechanism should be employed first. If the PHY mechanism does not work well, as measured by the number of unacknowledged frames exceeding a threshold, then the MAC level mechanism should be employed.

As one of average skill in the art will further appreciate, the legacy status and required use of protection mechanisms can be enabled in the ERP Information Element of the beacon frame (and probe response frame). Currently 802.11g uses bits 0 to indicate Non-ERP (i.e. 802.11b) present and bit 1 to force stations to Use Protection (MAC level). This can be extended to used the reserved bits (bits 3 through 7) to indicate legacy status of 802.11g or 802.11a stations. In one embodiment, bit 3 may be used to indicated "Legacy OFDM present". The bits would then be interpreted as follows:

| Bit 0 - Non ERP Present | Bit 1 - Use Protection | Bit 3 - Legacy OFDM Present | Action for 802.11n |
|---|---|---|---|
| 0 | 0 | 0 | Use 802.11n frames |
| 1 | 1 | 0 | Use MAC protection |
| 1 | 1 | 1 | Use MAC protection |
| 0 | 1 | 1 | Use PHY or MAC protection |
| 0 | 0 | 1 | Optionally use PHY or MAC Protection |

For 802.11n, the MAC level protection mechanisms are the same as for 802.11g. Stations should either use CTS to self or a CTS/RTS exchange to set the NAV (network allocation vector) of legacy stations.

Returning the logic diagram of FIG. 7, the processing continues at step 130 where the wireless communication device utilizes the selected protocol within the proximal region to set up a wireless communication within the proximal region. This was illustrated in FIGS. 3-6. The process then proceeds to step 132 where the wireless communication device uses its protocol for a data transmission of the wireless communication.

Figure 8:
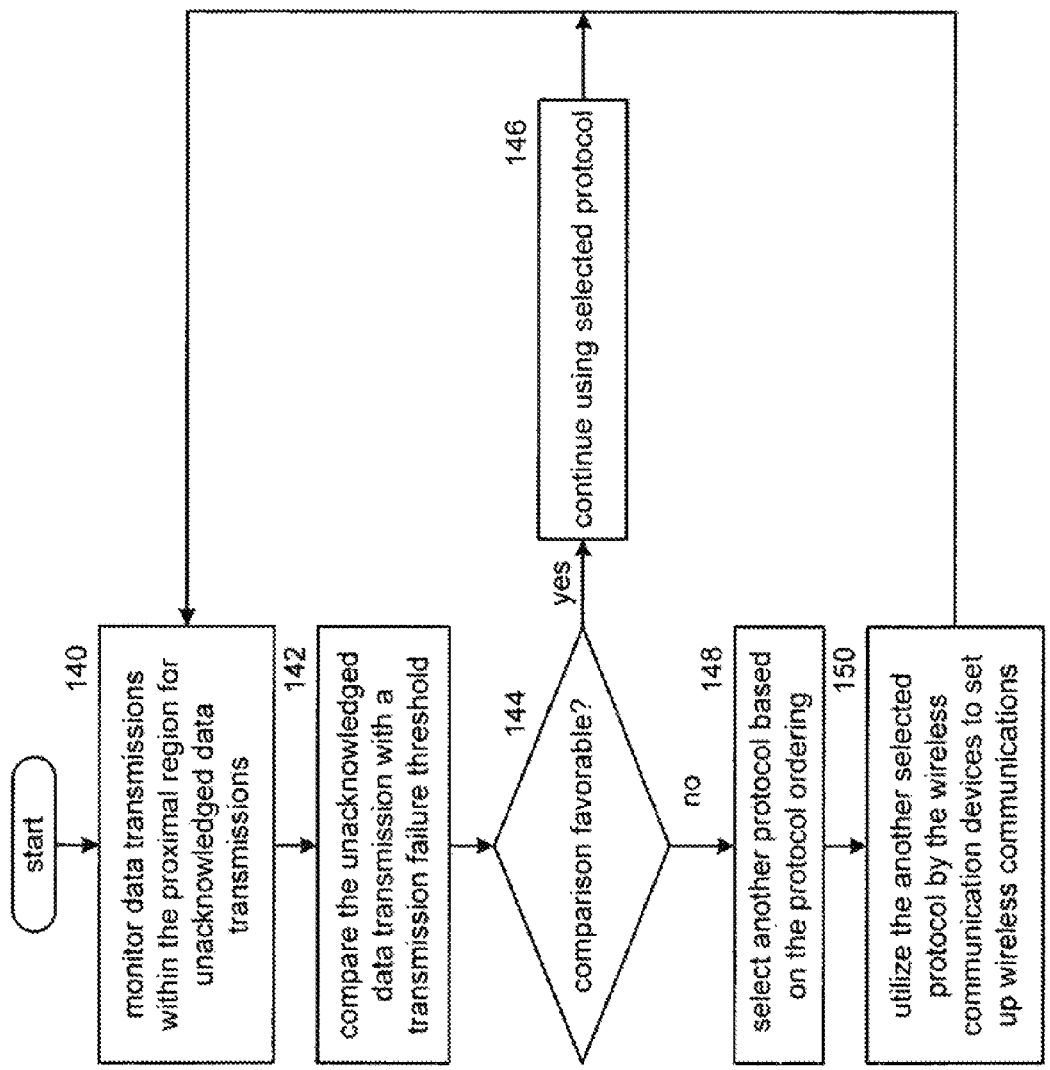
FIG. 8 is a logic diagram of a method for monitoring success of wireless multiple protocol communications in accordance with the present invention.

FIG. 8 is a logic diagram of method for determining whether the selected protocol should be changed. The processing begins at step 140 where the access point and/or the wireless communication devices, monitors data transmissions within the proximal region for unacknowledged data transmissions. The process proceeds to step 142 where the access point and/or the wireless communication device compares the unacknowledged data transmission with a transmission failure threshold (e.g., up to 5%). If the comparison is favorable, the process proceeds to step 146 where the selected protocol remains unchanged and the process repeats at step 140.

If, however, the comparison at step 144 was unfavorable, the process proceeds to step 148 where the access point and/or the wireless communication device selects another one of the protocols of the wireless communication devices within the proximal region based on the protocol ordering to produce another selected protocol. For example, the MAC layer protection mechanism may be selected to replace the PHY layer protection mechanism when too many transmission failures occur. The process then proceeds to step 150 where the wireless communication devices uses the another selected protocol within the proximal region to set up the wireless communication within the proximal region.

Figure 9:
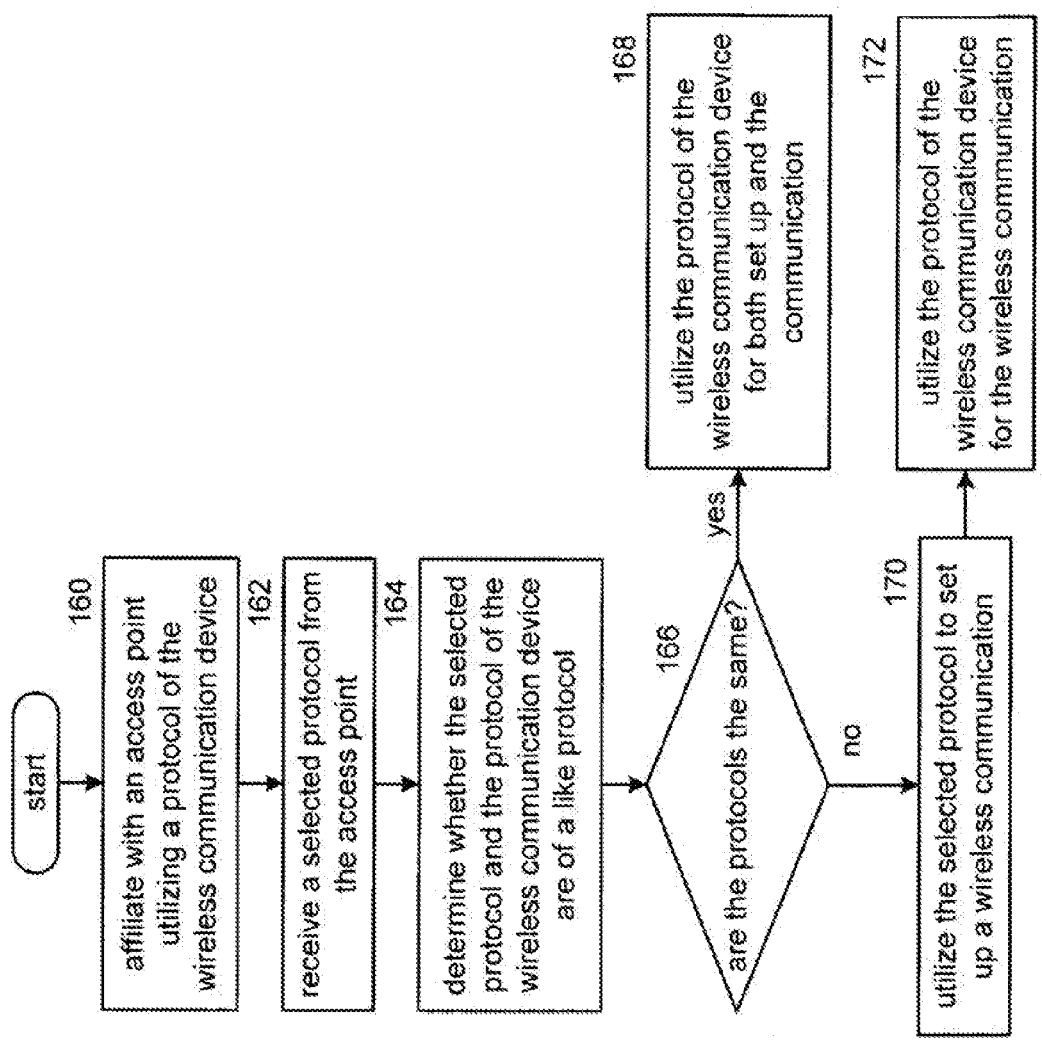
FIG. 9 is a logic diagram of a method for a wireless communication device to participate in a multiple protocol communication in accordance with the present invention.

FIG. 9 is a logic diagram of a method for a wireless communication device to participate in multiple protocol wireless communications. The process begins at step 160 where the wireless communication device affiliates with an access point utilizing a protocol (e.g., IEEE 802.11n) of the wireless communication device. The process then proceeds to step 162 where the wireless communication device receives a selected protocol from the access point. Note that the selected protocol and the protocol of the wireless communication device may be a wireless local area network communication formats in accordance with IEEE 802.11, IEEE 802.11a, IEEE 802.11b, IEEE 802.11g, IEEE 802.11n and/or further versions of the IEEE 802.11. Further note that the selected protocol includes a first frame format that includes a legacy header and a Media-Specific Access Control (MAC) layer partitioning field, a second frame format that includes a physical (PHY) layer backward compatible header, and/or a third frame format that includes a current version header and the MAC layer partitioning field.

The process then proceeds to step 164 where the wireless communication device determines whether the selected protocol and the protocol of the wireless communication device are of a like protocol. The process branches at step 166 to step 168 when the protocols are the same and to step 170 when the protocols are not the same. At step 168, the wireless communication device utilizes the protocol to set up a wireless communication and to transfer data. At step 170, the wireless communication device utilizes the selected protocol to set up a wireless communication. The process then proceeds to step 172 where the wireless communication device utilizes the protocol of the wireless communication device for the wireless communication.

Figure 10:
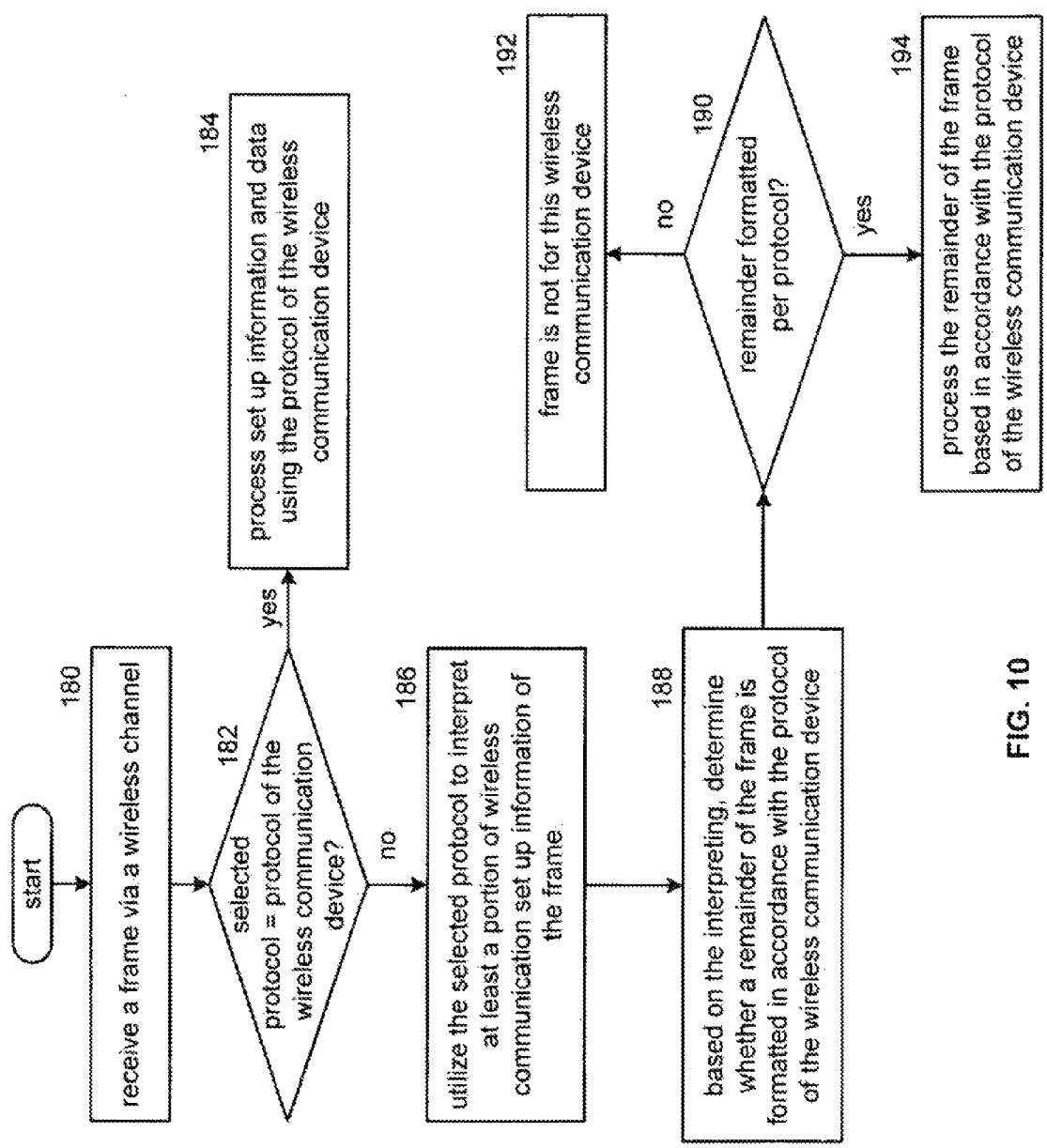
FIG. 10 is a logic diagram of another method for a wireless communication device to participate in a multiple protocol communication in accordance with the present invention.

FIG. 10 is a logic diagram of a method for a wireless communication device to participate in multiple protocol wireless communications. The process begins at step 180 where the wireless communication device receives a frame via a wireless channel. The process then proceeds to step 182 where the wireless communication device determines whether a selected protocol is not of a like protocol of the wireless communication device. When the selected protocol is the same as the protocol of the wireless communication device, the process proceeds to step 184 where the wireless communication device uses its protocol to set up a wireless communication and to transmit data.

If, however, the selected protocol is not the same as the protocol of the wireless communication device, the process proceeds to step 186 where the wireless communication device uses the selected protocol to interpret at least a portion of wireless communication set up information of the frame. In one embodiment, the wireless communication device may interpret the set up information by interpreting a header of the frame for conformity with a legacy physical layer format to provide the interpreting of the at least a portion of the wireless communication set up information and, when the header of the frame does not conform with the legacy physical layer format, determining that the remainder of the frame is formatted in accordance with the protocol of the wireless communication device. Note that the legacy physical layer format includes at least one of IEEE 802.11a and IEEE 802.11g and wherein the protocol of the wireless communication device includes IEEE 802.11n.

In another embodiment, the wireless communication device may interpret the set up information by interpreting the frame for conformity with a legacy Media-Specific Access Control (MAC) layer format to provide the interpreting of the at least a portion of the wireless communication set up information and, when the header of the frame does not conform with the legacy MAC layer format, determining that the remainder of the frame is formatted in accordance with the protocol of the wireless communication device. Note that the legacy physical layer format includes at least one of IEEE 802.11a, IEEE 802.11b, and IEEE 802.11g and wherein the protocol of the wireless communication device includes IEEE 802.11n.

The process then proceeds to step 188 where the wireless communication device, based on the interpreting of the at least a portion of the wireless communication set up information, determines whether a remainder of the frame is formatted in accordance with the protocol of the wireless communication device. The process then branches at step 190 to step 194 when the remainder of the frame is formatted in accordance with the protocol of the wireless communication device and to step 192 when it does not. At step 192 the wireless communication device ignores the frame. At step 194, the wireless communication device processes the remainder of the frame based in accordance with the protocol of the wireless communication device.

Figure 11:
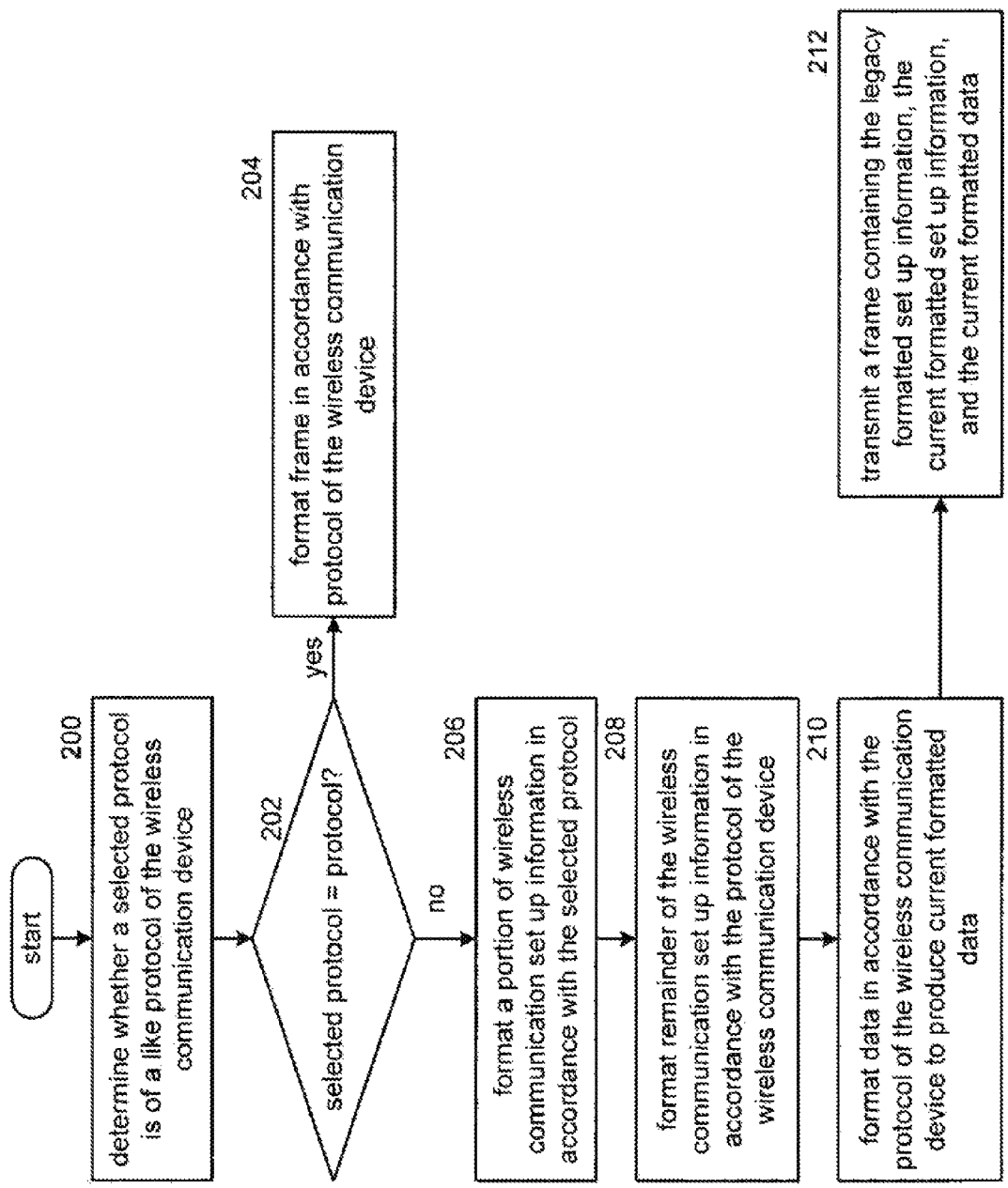
FIG. 11 is a logic diagram of yet another method for a wireless communication device to participate in a multiple protocol communication in accordance with the present invention.

FIG. 11 is a logic diagram of a method for a wireless communication device to participate in multiple protocol wireless communications. The method begins at step 200 where the wireless communication device determines whether a selected protocol is of a like protocol of the wireless communication device. The process branches at step 202 to step 204 when the selected protocol is the protocol of the wireless communication device and to step 206 when the protocols differ. At step 204, the wireless communication device formats the set up information portion of a frame and a data portion of the frame in accordance with its protocol. The wireless communication device then transmits the frame.

If, however, the selected protocol is not of the like protocol of the wireless communication device, the process proceeds to step 206 where the wireless communication device formats a portion of wireless communication set up information in accordance with the selected protocol to produce legacy formatted set up information. The process then proceeds to step 208 where the wireless communication device formats remainder of the wireless communication set up information in accordance with the protocol of the wireless communication device to produce current formatted set up information. The process then proceeds to step 210 where the wireless communication device formats data in accordance with the protocol of the wireless communication device to produce current formatted data. Refer to FIGS. 3-6 for examples of such formatting. The process then proceeds to step 212 where the wireless communication device transmits a frame containing the legacy formatted set up information, the current formatted set up information, and the current formatted data.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (that is, where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that a first signal has a greater magnitude than a second signal, a favorable comparison may be achieved when the magnitude of the first signal is greater than that of the second signal or when the magnitude of second signal is less than that of the first signal.

The preceding discussion has presented various embodiments for wireless communications in a wireless communication system that includes a plurality of wireless communication devices of differing protocols. As one of average skill in the art will appreciate, other embodiments may be derived from the teachings of the present invention without deviating from the scope of the claims.

What is claimed is:

1. A method for execution by a wireless communication device in a wireless local area network (WLAN), the method comprising:
   detecting a plurality of data transmissions from a first other wireless communication device to a second other wireless communication device;
   monitoring for a plurality of unacknowledged data transmissions to the plurality of data transmissions from the second other wireless communication device to the first other wireless communication device within a proximal region;
   comparing the plurality of unacknowledged data transmissions to a transmission failure threshold;
   when the plurality of unacknowledged data transmissions compare unfavorably to the transmission failure threshold:
      selecting another protocol based on a protocol ordering to produce a selected another protocol; and
      transmitting the selected another protocol to the first and the second other wireless communication devices, wherein the selected another protocol being utilized to set up a wireless communication within the proximal region.

2. The method of claim 1 further comprises:
   when the wireless communication is set up using the selected another protocol, utilizing, by a wireless communication device of the wireless communication devices, the selected another protocol for a data transmission.

3. The method of claim 1, wherein the protocol ordering comprises:
   an ordering of the protocols based on legacy ordering of wireless communication devices.

4. The method of claim 1, wherein the protocol ordering comprises:
   an ordering of the protocols based on a transmission efficiency ordering of the protocols.

5. The method of claim 1, wherein the proximal region comprises at least one of:
   coverage area of a basic service set;
   coverage area of an ad-hoc network; and
   coverage area of the basic service set and at least a portion of at least one neighboring basic service set.

6. The method of claim 1, wherein the selected another protocol comprises at least one of:
   a first frame format that includes a legacy header and a Media-Specific Access Control (MAC) layer partitioning field;
   a second frame format that includes a physical (PHY) layer backward compatible header; and
   a third frame format that includes a current version header and the MAC layer partitioning field.

7. The method of claim 1, further comprising:
determining a protocol of the first and the second other wireless communication device by:
determining frequency band of use of each of the wireless communication devices; and
based on the frequency band of use, determining wireless local area network communication format of each of the wireless communication devices.

8. The method of claim 1, wherein determining the protocol comprising:
monitoring at least one wireless channel of a plurality of channels within the proximal region for the plurality of unacknowledged data transmissions.

9. A method for a wireless communication device to participate in multiple protocol wireless communications, the method comprises:
affiliating with an access point that uses a protocol of the wireless communication device, wherein the access point is configured to monitor a plurality of data transmissions by the wireless communication device with another wireless communication device for a plurality of unacknowledged data transmissions to the plurality of data transmissions by the other wireless communication device;
receiving a selected another protocol from the access point of a proximal region when a plurality of unacknowledged data transmissions exceed a transmission failure threshold;
utilizing the selected another protocol to set up a wireless communication; and
utilizing the protocol of the wireless communication device for the wireless communication within the proximal region.

10. The method of claim 9, wherein the selected another protocol comprises at least one of:
a first frame format that includes a legacy header and a Media-Specific Access Control (MAC) layer partitioning field;
a second frame format that includes a physical (PHY) layer backward compatible header; and
a third frame format that includes a current version header and the MAC layer partitioning field.

11. The method of claim 9, wherein the selected another protocol comprises:
an ordering of the protocols based on a transmission efficiency ordering of the protocols.

12. The method of claim 9, wherein the proximal region comprises at least one of:
coverage area of a basic service set; and
coverage area of the basic service set and at least a portion of at least one neighboring basic service set.

13. A wireless local area network (WLAN) comprises:
a plurality of wireless communication devices; and
an access point, wherein each of the access point includes a processing module and memory, wherein the memory includes operational instructions that cause the processing module to:
detect a plurality of data transmissions from a first wireless communication device to a second wireless communication device of the plurality of wireless communication devices;
monitor for a plurality of unacknowledged data transmissions to the plurality of data transmissions by the second wireless communication device to the first wireless communication device within a proximal region;
compare the plurality of unacknowledged data transmissions of the proximal region to a transmission failure threshold;
when the plurality of unacknowledged data transmissions compare unfavorably to the transmission failure threshold:
select another protocol of the protocols of the plurality of wireless communication devices within the proximal region based on a protocol ordering to produce a selected another protocol; and
transmit the selected another protocol to the plurality of wireless communication devices, wherein each of the plurality of wireless communication devices includes a station processing module and station memory, the station memory includes operational instructions that cause the station processing module to utilize the selected another protocol within the proximal region to set up a wireless communication within the proximal region.

14. The WLAN of claim 13, wherein the station memory further comprises operational instructions that cause the station processing module to:
when the wireless communication is set up using the selected another protocol, utilize the selected another protocol for a data transmission.

15. The WLAN of claim 13, wherein the protocol ordering comprises:
an ordering of the protocols based on legacy ordering of wireless communication devices.

16. The WLAN of claim 13, wherein the protocol ordering comprises:
an ordering of the protocols based on a transmission efficiency ordering of the protocols.

17. The WLAN of claim 13, wherein the proximal region comprises at least one of:
coverage area of a basic service set;
coverage area of an ad-hoc network; and
coverage area of the basic service set and at least a portion of at least one neighboring basic service set.

18. The WLAN of claim 13, wherein the selected another protocol comprises at least one of:
a first frame format that includes a legacy header and a Media-Specific Access Control (MAC) layer partitioning field;
a second frame format that includes a physical (PHY) layer backward compatible header; and
a third frame format that includes a current version header and the MAC layer partitioning field.

19. The WLAN of claim 13, wherein the memory further comprises operational instructions that cause the processing module of the access point to:
determine protocols of the wireless communication devices by:
determining frequency band of use of each of the wireless communication devices; and
based on the frequency band of use, determining wireless local area network communication format of each of the wireless communication devices.

20. The WLAN of claim 13 further comprises:
the memory further including operational instructions that cause the processing module of the access point to:
monitor data transmissions within the proximal region for the at least some of the unacknowledged data transmissions; and
the station memory further including operational instructions that cause the station processing module to utilize the selected another protocol to set up the wireless communication within the proximal region.

* * * * *